United States Patent
Lucas

(12) 
(10) Patent No.: US 6,248,156 B1
(45) Date of Patent: Jun. 19, 2001

(54) PARTICULATE CAPTURE SYSTEM AND METHOD OF USE

(75) Inventor: Richard V. Lucas, Jordan, MN (US)

(73) Assignee: Scott Equipment Company, New Prague, MN (US)

( * ) Notice: Subject to any disclaimer, the term of this patent is extended or adjusted under 35 U.S.C. 154(b) by 0 days.

(21) Appl. No.: 09/303,871

(22) Filed: May 3, 1999

(51) Int. Cl.⁷ .......................... B01D 47/06; B01D 47/18
(52) U.S. Cl. .............................. 95/218; 95/219; 95/220; 95/225; 95/229; 95/230; 96/283; 96/301; 96/368
(58) Field of Search .................. 95/204, 216–220, 95/223–225, 228–230; 96/281–283, 301, 322, 332, 366, 368

(56) References Cited

U.S. PATENT DOCUMENTS

| | | | | |
|---|---|---|---|---|
| 0,879,219 | * | 2/1908 | Towns | 96/282 |
| 0,950,607 | * | 3/1910 | Baldwin | 95/204 |
| 2,040,700 | * | 5/1936 | Magaton | 96/283 X |
| 3,629,994 | * | 12/1971 | Jones | 95/17 |
| 3,772,847 | * | 11/1973 | Houtman et al. | 95/218 |
| 4,149,859 | * | 4/1979 | Vigesdal | 95/204 X |
| 4,308,037 | * | 12/1981 | Meissner et al. | 95/225 X |
| 4,874,402 | * | 10/1989 | Vogel | 95/220 X |
| 5,378,265 | * | 1/1995 | Pearl | 95/219 |
| 5,570,517 | * | 11/1996 | Luker | 34/424 |
| 5,641,338 | * | 6/1997 | Brookman | 95/216 X |
| 5,681,371 | * | 10/1997 | Carr | 95/204 |
| 5,887,808 | * | 3/1999 | Lucas | 241/82 |

FOREIGN PATENT DOCUMENTS

| 3333898A | * | 4/1985 | (DE) | 95/219 |
|---|---|---|---|---|

* cited by examiner

*Primary Examiner*—Robert H. Spitzer
(74) *Attorney, Agent, or Firm*—Vidas, Arrett & Steinkraus, PA

(57) ABSTRACT

A particulate capture system has an air circulating chamber that separates a first portion of particulates trapped within an air stream. The particulate capture system also has a water injection chamber that separates a second portion of particulates trapped within the air stream. The first portion of particulates is separated via circulating air flow. The second portion of particulates is separated via encapsulating the particulates in water and returning the encapsulated particulates to a cooling chamber where the particulates are blended with a bulk product being processed within the cooling chamber prior to collection of the bulk product.

20 Claims, 9 Drawing Sheets

PARTICULATE CAPTURE SYSTEM AND METHOD OF USE

BACKGROUND OF THE INVENTION

1. Field of the Invention

This invention relates to meat meal rendering apparatus. More particularly, this invention relates to a process and apparatus that facilitates highly efficient recovery of the fat content of meat meal products that normally is lost in the air stream during the rendering process.

2. Description of the Prior Art

Present meat meal rendering processes utilize high temperature cooking to remove bacteria and soften the meat, fat, bones, skin and the like. Generally, this cooking process produces a soft, pliable, dry product that contains approximately two and one-half to three percent moisture content. This dry product exits the cooking process at approximately 260° Fahrenheit having a ten to fifteen percent fat content. The cooked dry product is transferred to a press such as a tapered screw conveyor where that valuable fat content is squeezed out from the rest of the meat meal through small holes. The fat is a valuable resource, generally having more value (almost twice) than the meat itself.

Older meat meal rendering plants cooled the remainder of the meat meal having the fat removed via a long screw conveyor in which the hot meat meal was exposed to ambient air. The hot meal exposed to ambient air emitting steam caused condensation to accumulate on all exposed metal surfaces and make wet accumulations in the meal producing a perfect environment for salmonella growth. The foregoing problems that existed with older meat meal rendering processes and plants created a need to develop a closed air system for cooling cooked meat meal.

The next generation of meat meal rendering equipment resulted in the design and utilization of closed cooling machines such as the Scott Cooler System manufactured by Scott Equipment Company of New Prague, Minn. These closed cooling machines generally encapsulate the hot cooked rendered meat meal in a manner which prevents exposure of the cooked meat meal to ambient air, thereby preventing loss of moisture due to evaporation and also preventing the growth of Salmonella from exposure to the ambient air. Although these closed cooling machines advanced the state of the art, the efficiency of such machines has generally been in the eight-five to ninety percent range resulting in ten to fifteen percent loss of rendered meat meal during the cooling process. The ten to fifteen percent product loss was a result of meat meal particulate matter floating in the air stream used to cool the rendered meat meal and that was usually sent to a separator, e.g. cyclone, and then onward to a scrubber prior to being released to the atmosphere. The herein above described use of closed system cooling machines have been somewhat problematic in that the meat meal particulate caused the discharged air to have an unpleasant odor. The unpleasant odor is known to have been caused by the meat meal particulate mixed with the air. As discussed herein above, the process air is generally treated or further processed with scrubbers or the like before it is released into the atmosphere. The aforesaid air treatment/processing equipment has not historically been satisfactory for treatment of air mixed with meat meal particulate since the meat meal particulate is comprised substantially of fat which tends to plug the separators or cyclones or other like air processing and treatment equipment.

The meat meal rendering process discussed herein above was further improved by running the air stream through a bag house to capture the fat particulate floating in the air stream and to further improve the efficiency of the process. However, it was discovered that the bags quickly plugged up due to oil residue on the fat particulate which rendered the bags useless. Due to the foregoing problems associated with bag houses, cyclones are typically used in modern meat meal rendering processes to capture as much of the fat particulate as possible. However, cyclones are only about ninety-five percent efficient which means that some of the fat particulate is still lost in the discharged air stream. This particulate is low ash and high protein which makes it very valuable. In view of the foregoing, it is readily apparent that a meat rendering process is needed having the capability to efficiently and effectively capture the particulate that is lost in the discharged air stream of present meat rendering processes. Also needed is an apparatus that can be added to existing meat rendering processes to improve the efficiency associated with capturing the aforesaid fat particulate.

SUMMARY OF THE INVENTION

Accordingly, the present invention provides a system and method intended to overcome many of the shortcomings and attendant disadvantages of known meat rendering processes and associated apparatus that share problems considered unavoidable within the industry, some of which have been discussed herein above. The present invention, however, surmounts many of these problems with a radical new structure that accommodates novel placement of unique apparatus to enhance and optimize particulate recovery efficiency in a meat meal rendering process.

In one embodiment, a meat rendering particulate recovery process is constructed with a cooler system, a cyclone, a particulate capture system and closed loop wet particulate feedback system. The cooler system passes the dry product, e.g. meat, fat, skin, bones and the like through a counter flowing air stream which cools the dry product. The cool dry product is discharged from the cooling system and collected for future use as feed, food additives and the like. The air stream is directed into the cyclone where the particulate is discharged and collected. The air stream is then directed to the present particulate capture system where the air stream and remaining particulate are mixed with water via water injection nozzles. This final mixing process captures nearly all of the remaining particulate that is then directed back to the cooler system with additional water to increase the moisture content of the product that is discharged and collected from the cooling system.

In another embodiment, a meat meal rendering particulate recovery process is constructed as discussed above, but without use of a cyclone. The present inventor has found that the present inventive particulate capture system has a higher efficiency than cyclones as presently used by those skilled in the art. The air stream is directed out of the cooling system directly into the particulate capture system rather than into a cyclone such as done with known meat rendering processes. The air stream is circulated with air paddles rotating at speeds ranging up to approximately 1800 rpm which causes up to 99 percent of the particulate to gravitate to the bottom portion of the particulate capture system where it is then discharged and captured. The remaining air is then mixed with water as stated herein above and directed back to the cooler system with additional water. The remaining particulate is then discharged and collected with the other portions of the rendered meat products.

One embodiment of a particulate capture system according to the present invention includes a) an air circulating chamber having at least one inlet port through which an air stream containing particulates can be introduced into the air circulating chamber and further having at least one discharge port through which particulates released from an air stream within the air circulating chamber can be discharged from the air circulating chamber; b) a water injection chamber having at least one injection port configured to allow injection of water into the water injection chamber such that an air stream containing particulates that is introduced into the water injection chamber can be mixed with injected water to create muddy water and further having at least one discharge port through which an air stream and muddy water can be discharged from the water injection chamber; c) a rotatable paddle assembly axially disposed through the air circulating chamber and the water injection chamber, the rotatable paddle assembly having a plurality of circumferentially spaced paddles defining at least one rotation path; and d) means such as a substantially solid baffle having an orifice disposed there through and configured such that the rotatable paddle assembly can pass an air stream from the air circulating chamber into the water injection chamber while simultaneously prevent particulates released from an air stream within the air circulating chamber from entering into the water injection chamber. Most preferably, the air circulating chamber discharge port comprises means such as a slotted orifice gate having a selectively variable slot width for metering a volumetric flow of particulates released from an air stream within the air circulating chamber.

One feature of the present invention is the provision of a process and associated apparatus that cleanses an air product and simultaneously yields reduced odor.

Another feature of the present invention is the provision of a meat rendering process that captures substantially all particulate, even when fat products are formed as particulates within an air stream.

Yet another feature of the present invention is the provision of a high efficiency meat rendering process that substantially reduces or eliminates dangers associated with formation of Salmonella.

Still another feature of the present invention is the provision of a high efficiency meat rendering process that yields products having a moisture content that is controlled to a desired value.

Another feature of the present invention is the provision of a high efficiency meat rendering process that yields products that are easy to handle and package through production of cool meal that flows out of storage bins easier and simultaneously reduces dangers associated with spontaneous combustion.

Yet another feature of the present invention is the provision of a high efficiency meat rendering process that eliminates virtually all contamination associated with ambient air condensation within screw conveyors, chutes and bins.

Still another feature of the present invention is the provision of an apparatus that is useable in a meat rendering process to capture high fat particulates that can not be captured via use of cyclones.

Another feature of the present invention is the provision of an apparatus that is useable in a meat rendering process to increase the moisture content of the rendered product to a desired percentage level.

Yet another feature of the present invention is the provision of an apparatus and associated product conveyors that is compact, thereby preserving valuable floor space normally wasted by other known processing apparatus and systems.

Still another feature of the present invention is the provision of a high efficiency particulate recovery system that yields increased productivity and profitability.

Another feature of the present invention is the provision of a high efficiency particulate recovery system that has the capability to control the moisture content of the meal that is sold.

From the foregoing, it is clear that the present inventive process and apparatus associated therewith yields performance that is greatly enhanced over existing systems. Other features of the present inventive apparatus and process include ease of use, manufacture, enhanced serviceability, maintainability, upgradability, and enhanced expansion and diagnostics capability.

BRIEF DESCRIPTION OF THE DRAWINGS

Other objects and features of the present invention and many of the attendant advantages of the present invention will be readily appreciated as the same becomes better understood by reference to the detailed description when considered in connection with the accompanying drawings in which like reference numerals designate like parts throughout the figures thereof and wherein.

While the above-identified drawing figures set forth alternative embodiments, other embodiments of the present invention are also contemplated, as noted in the discussion. In all cases, this disclosure presents illustrated embodiments of the present invention by way of representation and not limitation. Numerous other modifications and embodiments can be devised by those skilled in the art which fall within the scope and spirit of the principles of this invention.

DETAILED DESCRIPTION OF THE PREFERRED EMBODIMENTS

The preferred embodiments described as follows address the long felt need by those in the rendered meat meal industry to provide a highly efficient rendering process capable of eliminating substantially all product loss, particularly where a portion of the product comprises fat particulates captured by the air stream in a closed loop rendering process. In accordance with the present invention, the preferred embodiments described herein can readily recover about 99.75% of the particulates that are captured by the air stream. The preferred embodiments described herein can also be used to control the moisture content of the discharged meal product as well as eliminate substantially all air contamination and odor in the air stream associated with the rendering process.

Figure 1:
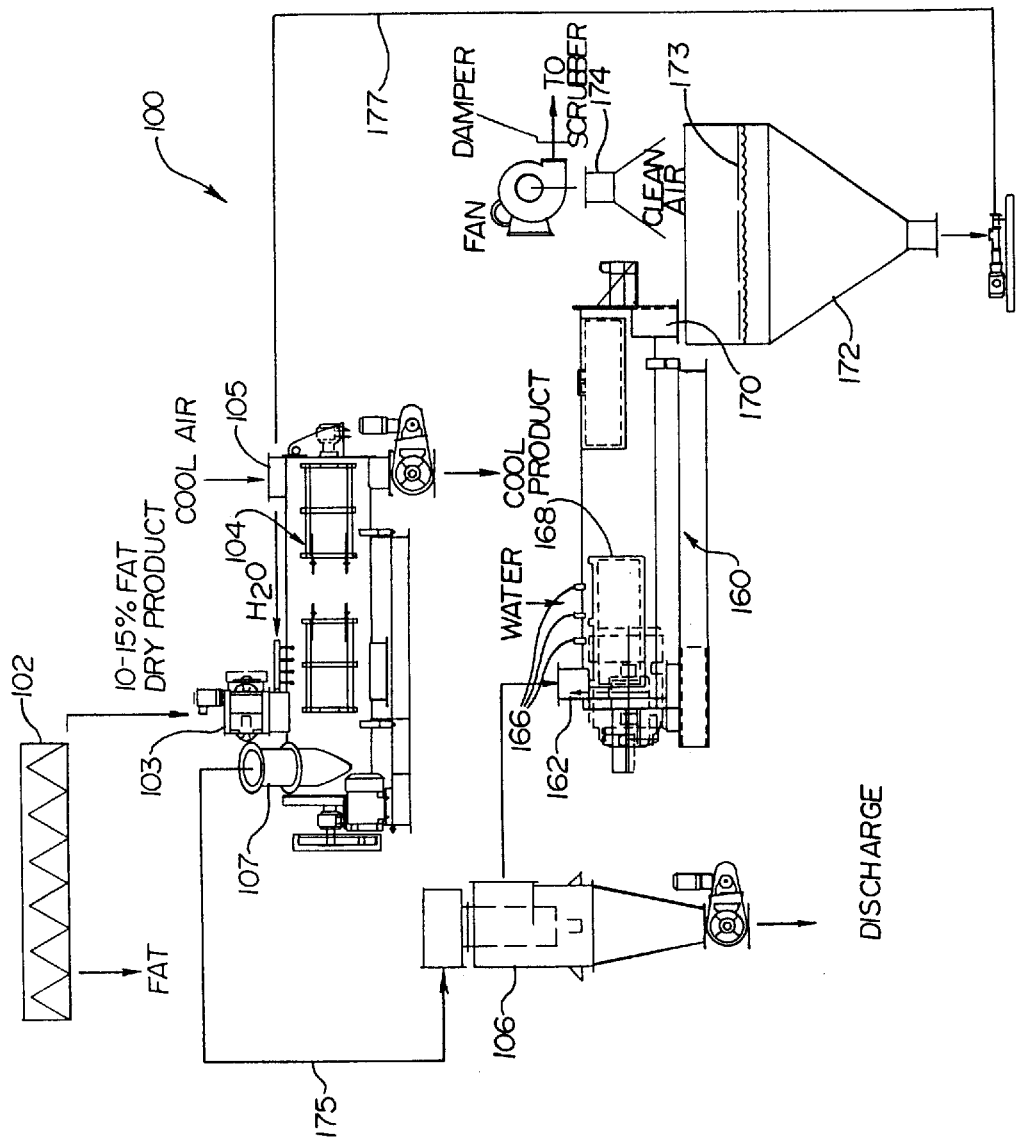
FIG. 1 is a flow chart illustrating one embodiment of a process used to capture particulates trapped in an air stream and utilizing the present particulate capture system in association with a meat meal rendering process.

Looking now at FIG. 1, a flow chart illustrates one embodiment of a system 100 used to capture particulates trapped in an air stream and utilizing the present particulate capture system 160 in association with a meat meal rendering process. The system 100 provides a process to close loop and capture the particulates that are normally lost in the air stream discharged from cyclones and the like associated with rendered meat meal processes. As stated herein before, the cooling of rendered meat meal presents a problem that is caused by the fat content of the product. The fat content plus the extreme heat of the product make it difficult to separate from the air stream. Cyclones will work up to ten to twelve percent fat content, but cyclones do not provide the desired efficiency for most operations. The present system 100 encapsulates the particulates in water that is subsequently reprocessed to capture nearly 100% of the particulates. With continued reference to FIG. 1, the meat meal rendering process includes a cooking process to soften the meat meal which is subsequently passed through a press 102. The press 102 separates 85% to 90% of the fat portion of the meat meal, the remaining portion of the meat meal product being transported to a closed cooler system 104 such as the Scott Cooler System discussed herein before. In one embodiment, the cooler system 104 comprises a simple cylinder that totally encloses the product such that minimal product is lost to the air stream used to cool the product. Ambient air is preferably used in combination with water that is injected to further cool the product as well as increase the moisture content of the meat meal product to a desired level.

Generally, the cooked meat meal product leaving the press 102 is quite dry, having only about 2½% to 3% moisture content. Generally, this cooked meat meal product also exits the press 102 at a temperature of about 260° Fahrenheit and having a fat portion consisting of about 10% to 15% of the total rendered product. It is desirable in the industry to collect as much of the fat portion of the rendered product as possible since fat is a valuable commodity, presently selling commercially for about 15 cents to 20 cents per pound of fat. Looking again at FIG. 1, it can be seen the cooked dry product enters the cooler system 104 at a product entry port 103 near one end while the cooling air enters the cooler system 104 through an air entry port 105 located at the opposite end of the cooler system 104. As the cool air is pumped through the cooler system 104, it passes over the cooked product that is moving in the opposite direction to produce a counter flow condition between the cooling air and the cooked product. During this counter flow condition, fat particulates within the cooked product are undesirably mixed with the cooling air which exits the cooling system 104.

It is generally known by some that 10% to 15% of the cooled product is captured by the cooling air stream and exits the cooling system 104 as trapped fat particles. With continued reference to FIG. 1, one embodiment for recapturing the aforesaid trapped fat particles includes use of a cyclone 106, well known to those skilled in the art. The air stream exiting the cooling system 104 is conveyed to a cyclone 106 where air is circulated in a manner which causes up to 95% of the trapped particulates to separate from the air stream. The released particulates are then discharged at the bottom of the cyclone 106 where they can be packaged as desired. The present inventor has found that substantially all the remaining 5% of the trapped particulates can also be recaptured by sending the air stream exiting the cyclone through a particulate capture system 160 where the remaining trapped particulates are encapsulated by water, thereby causing substantially all the remaining particulates to separate from the air stream. Looking again at FIG. 1, it can be seen that the air stream exits the cyclone 106 and enters an air inlet port 162 near one end of the particulate capture system 160. A more detailed explanation of the present particulate capture system 160 will be described herein below with reference to FIGS. 2–8. Generally, the air stream enters an air chamber (depicted as 164 in FIGS. 2–5 and 7) via the air inlet port 162 where air paddles, rotating at speeds of up to approximately 1800 rpm cause greater than 95% of the trapped particulates to separate from the air stream. The released particulates are forced to travel near the inner periphery of the outer wall of the particulate capture system 160 where they are eventually deposited out a lower discharge port (depicted as 166 in FIG. 7). The remaining trapped particulates travel near the center of the particulate capture system 160 where they follow the air stream into a water injection chamber 168. As the remaining trapped particulates move through the water injection chamber 168, the particulates become encapsulated with the water via water injection ports 166 which causes substantially all the remaining trapped particulates to be released from the air stream which then exits the particulate capture system 160 at its opposite end at a second discharge port 170.

As the aforesaid trapped particulates become encapsulated with water, they are released from the air stream in the form of "muddy water". This muddy water is released into a liquid storage tank 172 where the muddy water, and thus the released particulates are transmitted back to the cooling system 104 where the particulates are recaptured as useable rendered product. The present inventor has found the present embodiment useful in removing odor from the air stream that is subsequently sent to a scrubber, not shown, and then released to the atmosphere. Since the air stream has already been cleaned via the injected water in the particulate capture system, little, if any residue is left in the air stream to cause plugging of the aforesaid scrubbers, a problem with present systems that rely solely on cyclones to recapture fat particulates trapped in the air stream. Most preferably, the system 100 uses a low velocity discharge port 174 such that any released particulates are not picked up by the air stream going to the scrubber. A baffle 173 within the liquid storage tank 172 above the muddy water level also aids to prevent the loss of water encapsulated particulates from being picked up by the air stream that is exhausted into the atmosphere or to a scrubber. Those skilled in the art will appreciate that many types of baffles can be effective to accommodate the aforesaid isolation of water encapsulated particulates from the air stream. In one embodiment, the system 100 uses a twelve-inch diameter air pipe 175 between the cooling system 104 and the particulate capture system 160. It shall be understood the present invention is not so limited however, and that many other pipe sizes will work just as well to accommodate the desired functionality. The present inventor found that a one-inch nominal diameter water pipe 177 produced workable results when transporting muddy water back to the cooling system 104. Preferably, the muddy water is injected into the cooling system 104 near the dry product entry port 103 such that it can be mixed with the bulk hot dry product during the cooling process.

Due to its high efficiency, the present inventor has found that the novel particulate capture system 160 will produce the desired results without necessitating the need for a cyclone 106. Therefore, a more preferred embodiment of a process 100 for recapturing particulates, e.g. fat laden particulate, eliminates the cyclone 106 such that the cooling system 104 can be coupled directly to the particulate capture system 160 via the aforesaid air pipe 175.

Present meat meal rendering processes are capable of processing approximately 5,000 pounds to about 30,000 pounds of product per hour. During processing, about ten to fifteen percent of the total product is lost in the air stream from the cooler 104. This means that a process that is working 20,000 pounds of product per hour will lose somewhere between 2,000 and 3,000 pounds of product in the air stream. Since cyclones are only 95% efficient, any process using a cyclone will be unable to salvage about 100 to 150 pounds of product per hour that is wasted in the air stream. The present inventor has found the present particulate capture system 160 efficiency to be such that the aforesaid 100 to 150 pounds of product can be recaptured by the particulate capture system 160 with a loss of no greater than one quarter of one percent of the 100 to 150 pounds of product worked by particulate capture system 160. The present inventor has found that water in the particulate capture system 160 encapsulates 99.75% of the particulate in the water and has the additional advantage of reducing odor in the air stream, as stated herein above. As stated above, the water with the particulate in it (muddy water) is subsequently pumped back to the cooling system 104. Tests have shown that the muddy water formulated by the particulate capture system 160 consists of four parts water and one part solid. It can be appreciated by those skilled in the art that if 400 pounds of muddy water is pumped back to the cooler system 104 that is working a product at a temperature of 260° Fahrenheit, almost all of the water will evaporate in the cooler system 104. Accordingly, the present inventor has also found that raising the moisture content of the finished product worked by the cooler system 104 from an initial three percent value to a desired value of five percent requires that an additional 400 pounds of water must be added to the cooler system 104 when the system 100 is working product at a production rate of 20,000 pounds per hour. Therefore, in view of the foregoing, the present inventor found that raising the moisture content of the finished product by two percent required a ratio of water to solids of eight to one (8:1) when the system 100 is producing finished product at the rate of 20,000 pounds each hour. In this manner, the moisture content of the finished product will be controlled. The following table illustrates the working characteristics of the system 100 at a production rate of 20,000 pounds per hour.

TABLE I

| Production Rate | Product Lost in Air Stream | Product Lost in Cyclone | Product Lost in Particulate Capture System |
| --- | --- | --- | --- |
| 20,000 lbs./hour | 2,000 lbs. | 150 lbs. | 0.25 lbs. |

Figure 2:
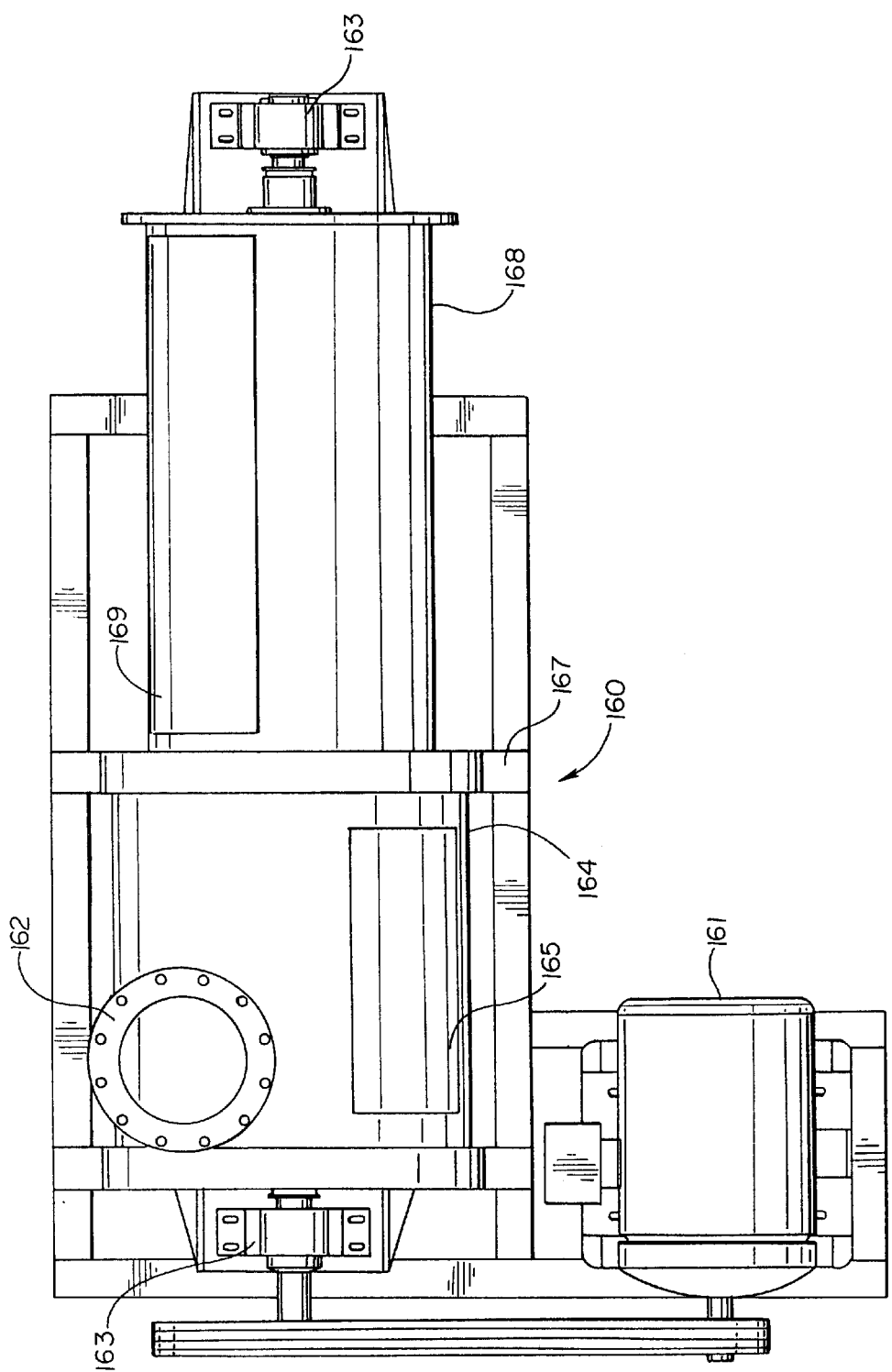
FIG. 2 is a top view illustrating one embodiment of the particulate capture system shown in FIG. 1.

Moving now to FIG. 2, a top view illustrates one embodiment of the particulate capture system 160 suitable for use with the process 100 depicted in FIG. 1 to recapture fat particulates trapped in the air stream exiting a rendered meal cooler system 104. It can be seen that the particulate capture system 160 has an air stream inlet port 162 that can be coupled to a cyclone 106 or optionally can be coupled directly to the air stream outlet port 107 of the cooler system 104 to create an extremely high efficiency particulate recovery system. The particulate capture system 160 includes an air circulation chamber 164 that acts somewhat like a cyclone, but inherently is more efficient than a cyclone due to a unique rotating air paddle discussed herein below with reference to FIG. 8. The rotating air paddle has been found by the present inventor to accommodate speeds up to about 1800 rpm, thereby rendering the air circulating chamber 164 capable of processing the air from more than 30,000 pounds of product per hour of operation. Preferably, the air circulating chamber 164 has an inspection door 165 that can be opened to expose the inner space of the air circulating chamber 164 for inspection, repair and maintenance purposes. A transition structure 167 prevents particulates separated from the air stream in the air circulating chamber 164 from entering the water injection chamber 168 where the air stream passes through water that is injected into the water injection chamber 168 via water injection nozzles shown in FIG. 5. In one embodiment, the transition structure 167 comprises a substantially flat plate or baffle having an orifice sized and located to allow passage of the rotating air paddle there through. Most preferably, the orifice is large enough to also allow the air stream entering the air inlet port 162 to pass through the air circulating chamber 164 and into the water injection chamber 168, but small enough to prevent particulates released in the air circulation chamber 164 from entering the water injection chamber 168. Preferably, the water injection chamber 168 also includes an inspection door 169 that can be opened as desired to inspect, repair and maintain the inner wet portion of the water injection chamber 168 as well as the rotatable air paddle. The present inventor found that a 30 horsepower motor 161 provided the necessary power to drive the rotatable paddle wheel at speeds sufficient to render the particulate capture system 160 workable for production rates exceeding 30,000 pounds of product per hour. In one preferred embodiment, pillow bearings 163 are used to support the shaft ends of the rotatable air paddle.

Figure 3:
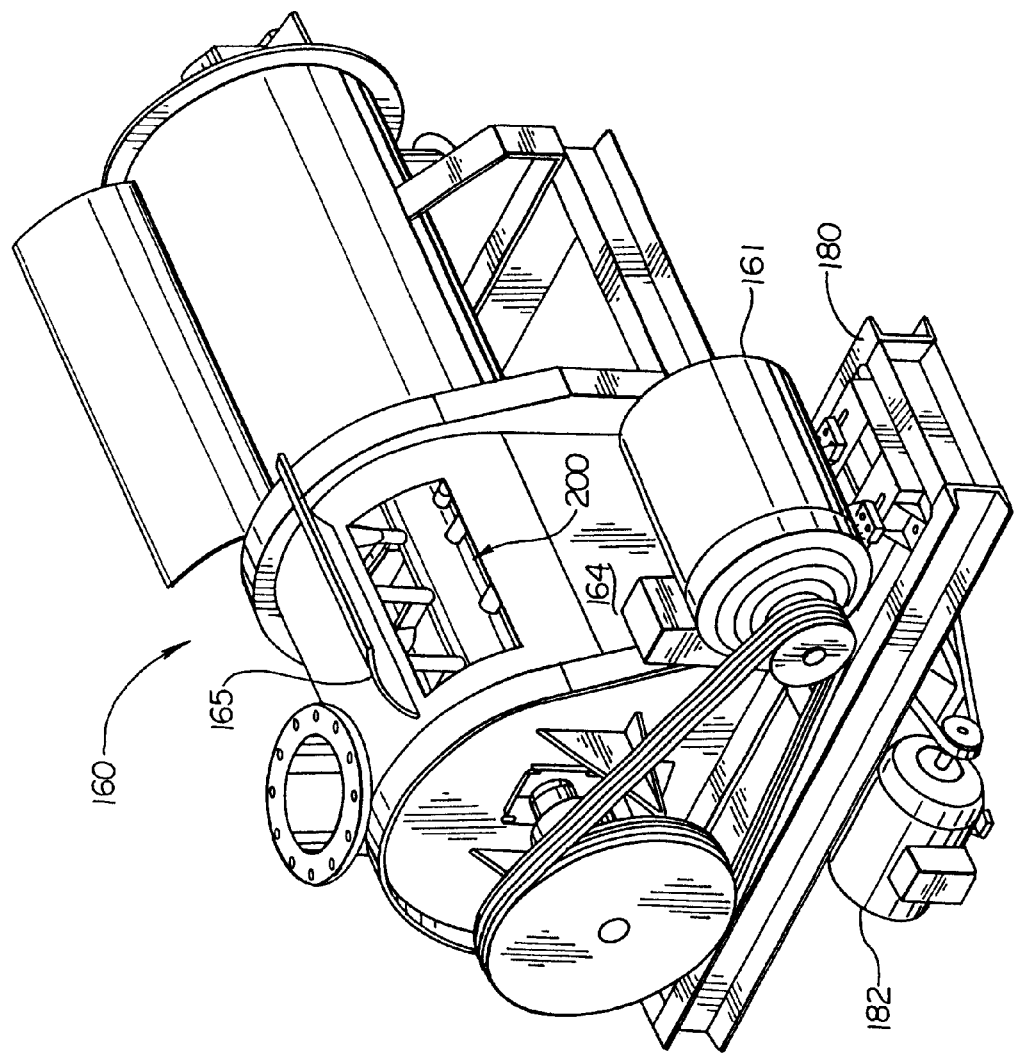
FIG. 3 is a right isometric view of the particulate capture system illustrated in FIG. 2, depicting details of the air circulation portion of the particulate capture system.

FIG. 3 is a right isometric view of the particulate capture system 160 illustrated in FIGS. 1 and 2, depicting in greater detail, the air circulation chamber 164 portion of the particulate capture system 160. It can be seen that opening the inspection door 165 of the air circulating chamber 164 exposes the rotatable air paddle 200 that is driven by the external drive motor 161. The particulate capture system 160 is configured to removably mount on a rigid, stable mounting frame 180. Also attached to the particulate capture system 160 is a suction fan motor 182 that pulls a vacuum on the air circulating chamber 164 to capture any particulates that have been separated from the air stream by the rotatable air paddle 200. It will be appreciated that the present invention is not so limited however, and that many alternative mounting structures can just as easily be utilized with the present particulate capture system 160 so long as the desired functionality is maintained.

Figure 4:
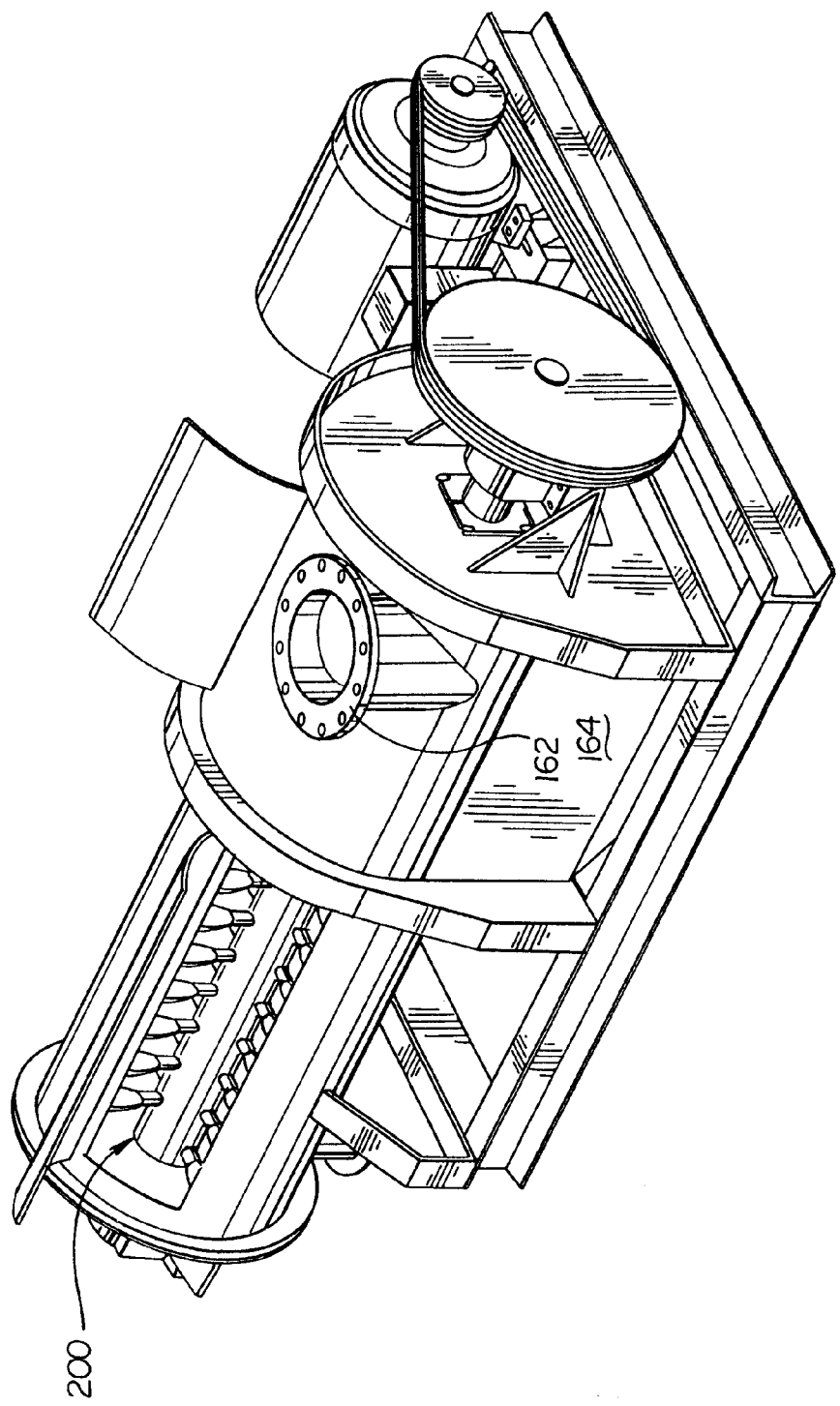
FIG. 4 is a left isometric view of the particulate capture system illustrated in FIG. 2, depicting details of the water injection portion of the particulate capture system.

FIG. 4 is a left isometric view of the particulate capture system 160 illustrated in FIGS. 1–3, depicting details of the inner wet portion of the water injection chamber 168 of the particulate capture system 160. The water injection chamber 168 houses one portion of the rotatable air paddle 200 that is configured to function in a manner that promotes encapsulation of up to 99.75% of the remaining particulates in water. It shall be understood that the air inlet port 162 need not be positioned on the particulate capture system 160 at any particular location, but can be positioned radially at any point on the air circulating chamber 164 to accommodate coupling the particulate capture system 160 directly to the cooler system 104. In like manner, the cooler system 104 or portions thereof can be rotated to accommodate direct coupling to the air inlet port 162 of the particulate capture system 160, thus eliminating unnecessary piping that can coat with fatty product and become plugged.

Figure 5:
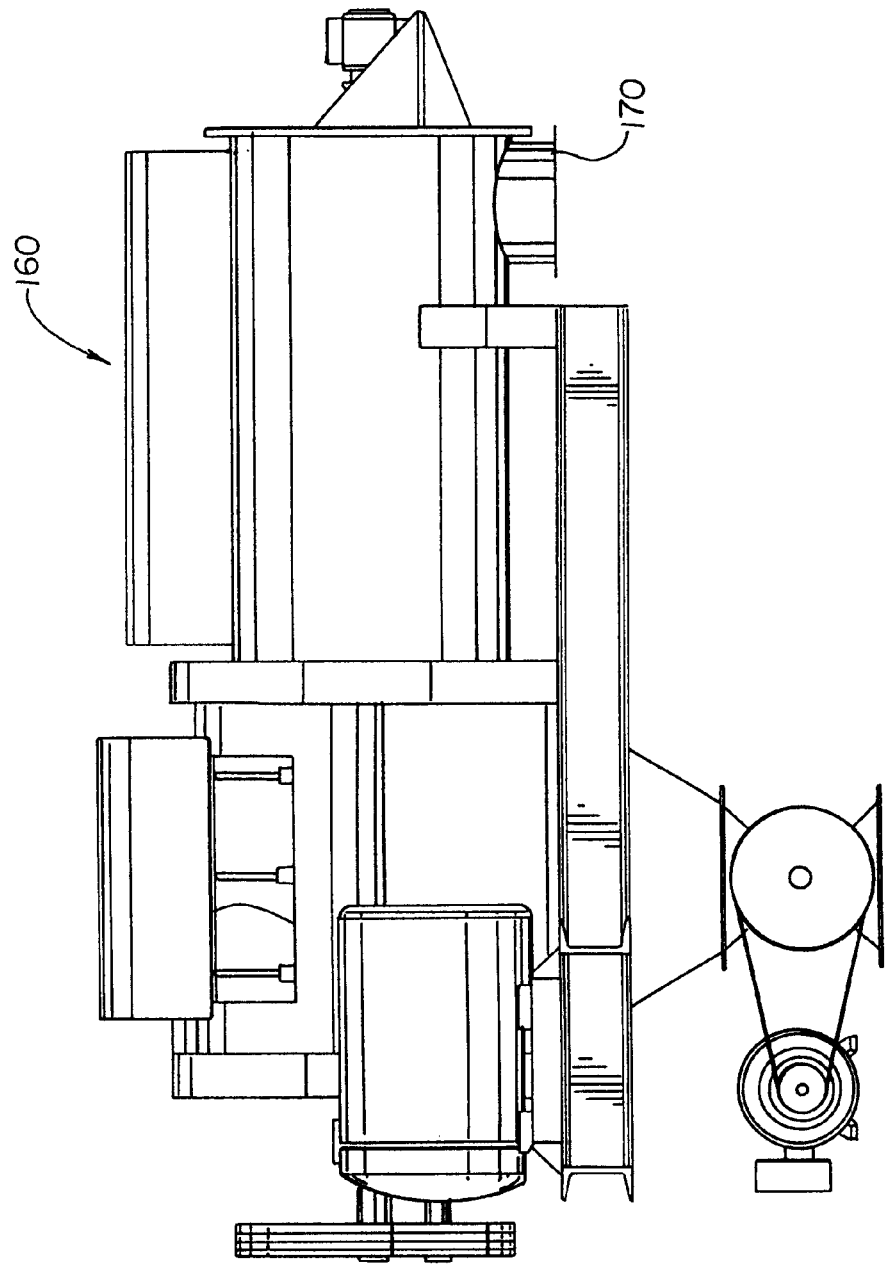
FIG. 5 is a side view of the particulate capture system illustrated in FIG. 2.

Looking now at FIG. 5, a side view of the particulate capture system 160 illustrated in FIGS. 1–4 is shown. The particulate capture system 160 can be seen to have a second discharge port 170 that functions to discharge the water encapsulated particulates as well as the cleansed air stream into a tank 172 that is configured to contain the water encapsulated particulates. Most preferably, the storage tank 172 has an inner baffle to separate the cleansed air from the water encapsulated particulates ("muddy water"). Because the air within the storage tank 172 is now cleansed of virtually all fat particulates, the air is quite odorless and quite clean. Therefore, this cleansed air can be sent directly to a scrubber or like apparatus before being emitted into the atmosphere with no detrimental effects on the scrubber or like apparatus. With reference again to FIG. 1, it can be seen that the cleansed air is passed through a low velocity discharge 174. The use of a low velocity discharge 174 ensures that captured particulates entering the storage container 172 are not recaptured by the air stream and inadvertently emitted to the atmosphere, thereby undesirably lowering the particulate capture system 160 efficiency. Looking again at FIG. 5, it shall be understood that the second discharge port 170 need not be located at or near the bottom portion of the water injection chamber 168, but can be permanently rotated on the housing of the water injection chamber 168 to any other desired radial position so long as the necessary functionality is maintained.

Figure 6:
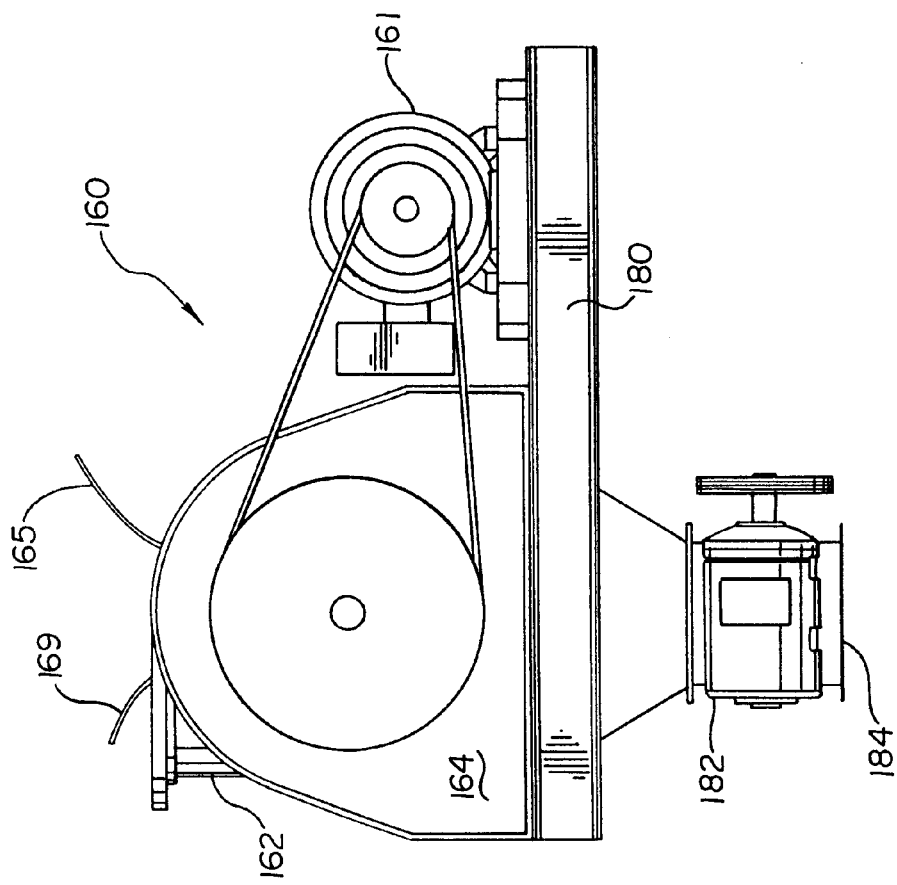
FIG. 6 is a front view of the particulate capture system illustrated in FIG. 2.

FIG. 6 is a front view of the particulate capture system 160 illustrated in FIGS. 1–5 and shows one preferred embodiment associated with positioning individual components of the system 160 with respect to one another. For example, the inspection doors 165 and 169 can be seen to open in opposite directions, while the external drive motor 161 and fan motor 182 can be seen to be positioned to one side and beneath the mounting frame 180 respectively. The air stream enters the air circulation chamber 164 through the top air entry port 162 while the particulate separated from the air stream exits the air circulation chamber 164 through a lower air outlet port 184. The present inventor has found this particular configuration to provide desired workable results when combined with a Scott cooler to separate fat particulates captured in the air stream leaving the Scott cooler. The present invention is not so limited however, and it shall be understood that many other configurations will also work to provide desired workable results, as stated herein above.

Figure 7:
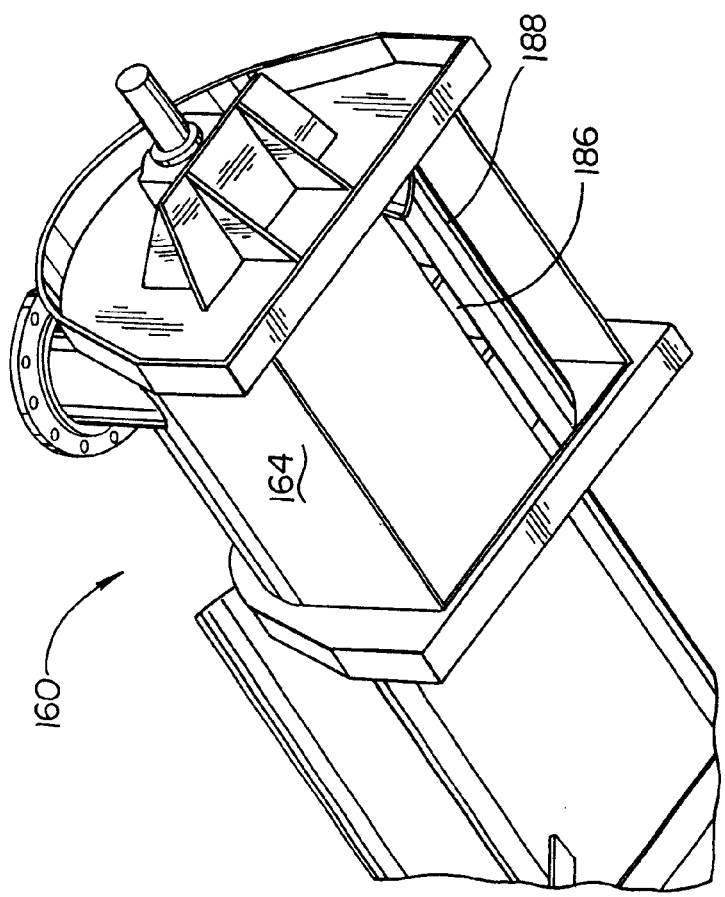
FIG. 7 is a partial isometric view of the particulate capture system depicting details of the gate inside separator portion of the particulate capture system.

Moving now to FIG. 7, a partial isometric view of the particulate capture system 160 depicts details of the gate inside separator portion of the air circulating chamber 164. Most preferably, the air circulating chamber 164 is configured with a slot 186 that runs the length of the air circulating chamber 164 as shown. As the particulates are separated from the air stream by the rotating air paddle 200, they are forced through the slot 186 and down into the lower air outlet port 184 shown in FIG. 6. The present inventor has found that use of a one inch wide slot 186 provides the desired workable results. In one preferred embodiment, the slot 186 can be varied in width by adjusting the position of a hinged door 188 that is configured to alter the slot 186 width between less than one inch width to greater than six inches in width. The adjustable feature of the slot width allows the particulate capture system 160 to be configured for use with different types of particulates by selectively controlling the metering of volumetric flow associated with particulates released from an air stream within the air circulating chamber 164. In the instant case, a one inch slot width was found to provide workable results when used to filter fat particulates, as stated above.

Figure 8:
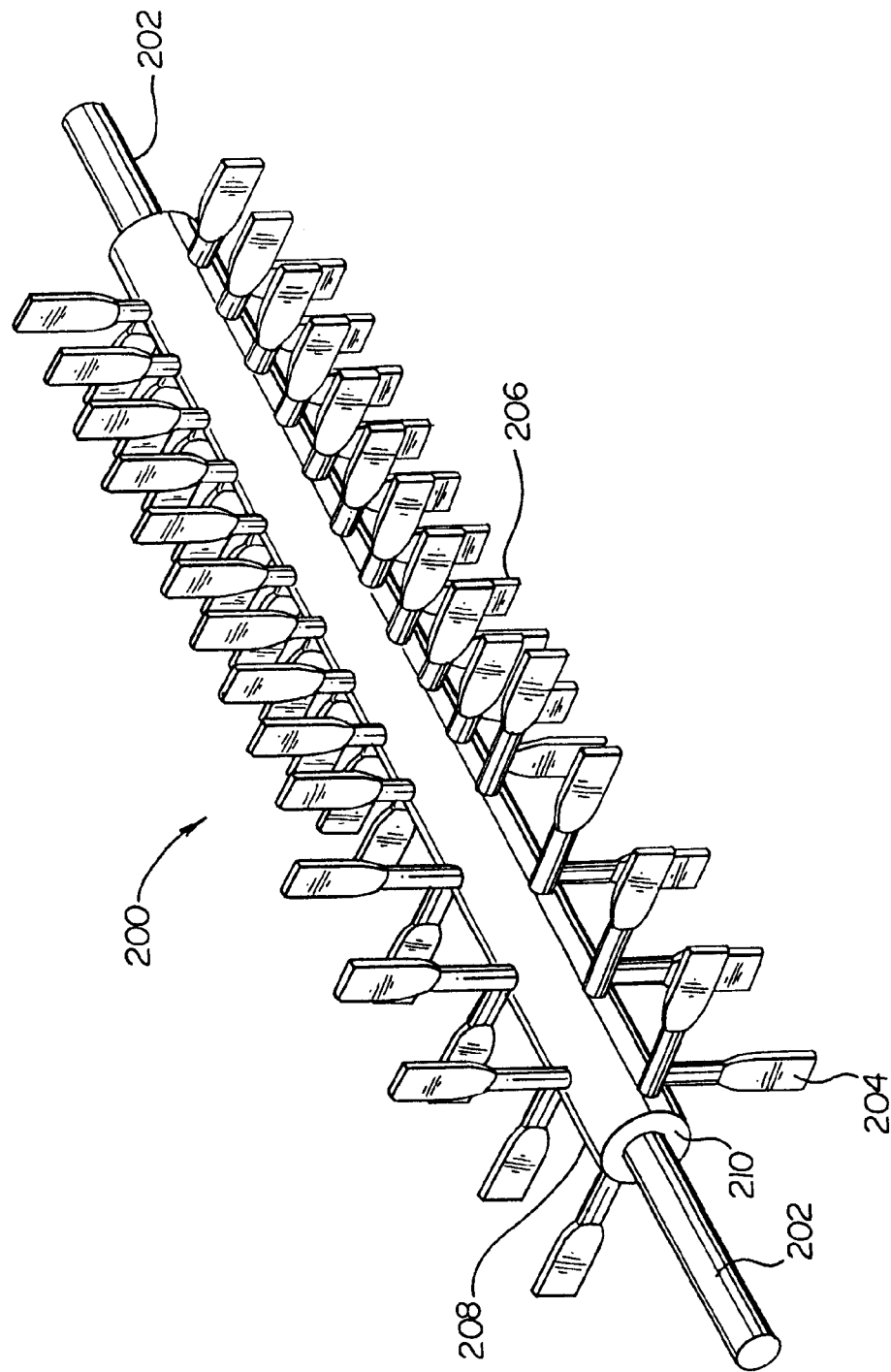
FIG. 8 illustrates one embodiment of a rotatable paddle apparatus suitable for use with the present particulate capture system.

FIG. 8 illustrates one embodiment of a rotatable paddle apparatus 200 suitable for use with the present particulate capture system 160. The apparatus 200 has a drive shaft 202 configured at each end to work in association with the aforesaid pillow block bearings 163. A larger portion 210 of the drive shaft 202 is configured to removably receive desired air paddles 206, 208. The air paddles 208 used in association with the air circulation chamber 164 are configured to move the air within the air circulation chamber 164 at a sufficiently high velocity to remove greater than 95% of the particulates trapped in the air stream. The air paddles 206 used in association with the water injection chamber 168 are configured to move the air through the injected water such that greater than 99.75% of the fat particulates trapped in the air stream are recovered by the present particulate capture system 160. Additionally, the paddles 206,208 keep the chambers 164, 168 scrapped clean on the inside and prevent build up of fatty particulate material. A more detailed description of rotatable air paddles (hammers/beaters) suitable for use with the present particulate capture system 160 is presented in U.S. Pat. No. 5,887,808, entitled High Efficiency Grinding Apparatus, issued Mar. 30, 1999 to Richard V. Lucas. U.S. Pat. No. 5,570,517, entitled Slurry Dryer, issued Nov. 5, 1996, to William A. Luker, assigned to the same assignee as the present invention, also describes paddles or blades on a rotating shaft in a cylindrical housing. Both references are incorporated by reference herein in their entirety. With continued reference to FIG. 8, it can be appreciated that less air paddles 204 per unit length are necessary when used in association with the air circulating chamber 164 as contrasted with the density of air paddles 206 used in association with the water injection chamber 168. It can be appreciated that the particulate capture system 160 can be cleaned in place via strategically positioned water or steam nozzles similar or like the water injection nozzles 166 described herein before in association with encapsulating the particulate in water.

Figure 9:
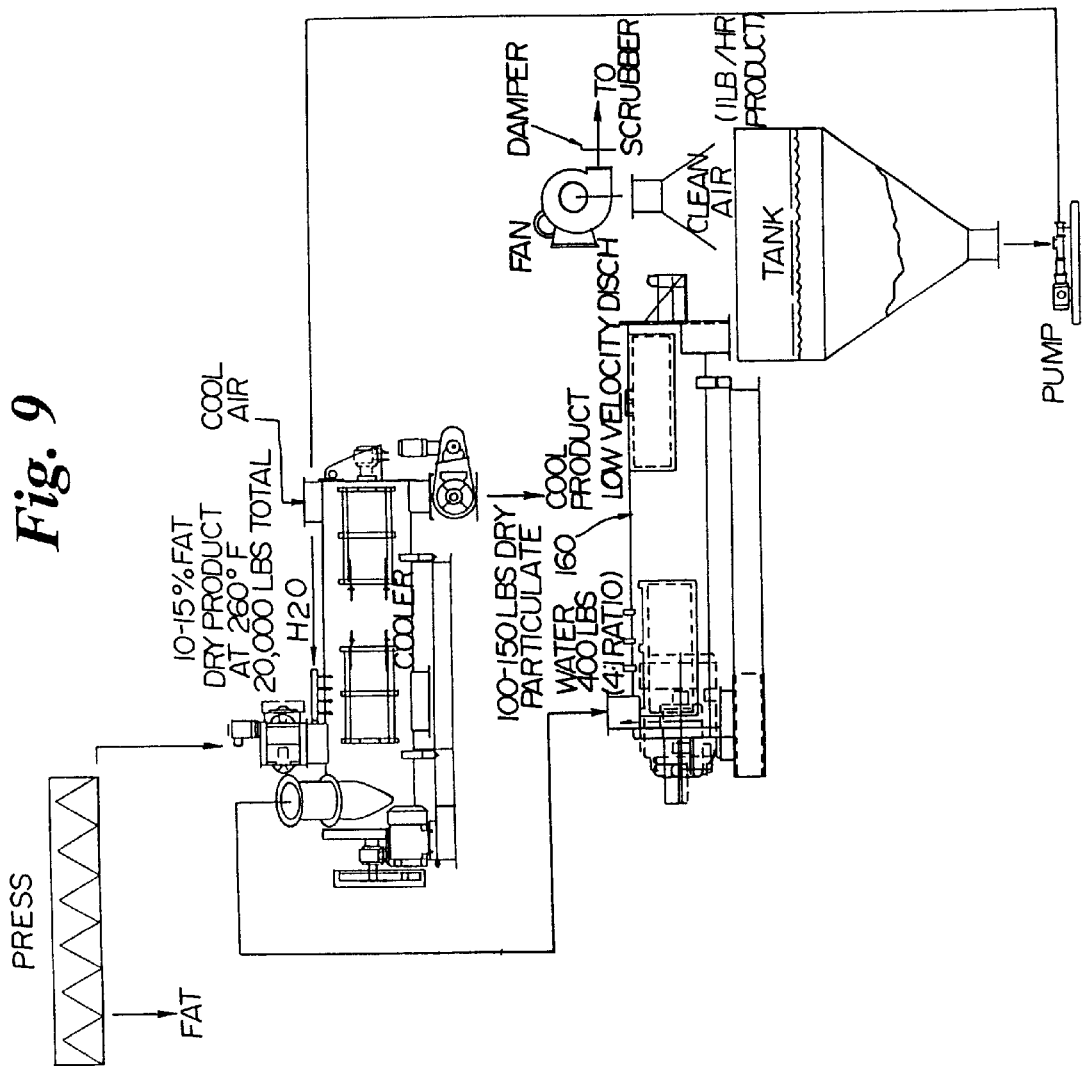
FIG. 9 is a flow chart illustrating another embodiment of a process used to capture particulates trapped in an air stream and utilizing the present particulate capture system in association with a meat meal rendering process.

FIG. 9 is a flow chart illustrating another embodiment of a process used to capture particulates trapped in an air stream and utilizing the present particulate capture system 160 as discussed herein above. In this embodiment, the process does not utilize a cyclone 106, since the present particulate capture system 160 was found by the present inventor to achieve the desired results without necessitating the need for such a cyclone 106.

Having thus described the preferred embodiments in sufficient detail as to permit those of skill in the art to practice the present invention without undue experimentation, those of skill in the art will readily appreciate other useful embodiments within the scope of the claims hereto attached. For example, although the present invention has been described as useful for the meat meal rendering industry, those of skill in the art will readily understand and appreciate that the present invention has substantial use and provides many benefits in other industries as well. In view of the foregoing descriptions, it should be apparent that the present invention represents a significant departure from the prior art in construction and operation. However, while particular embodiments of the present invention have been described herein in detail, it is to be understood that various alterations, modifications and substitutions can be made therein without departing in any way from the spirit and scope of the present invention, as defined in the claims which follow.

I claim:

1. A method of capturing particulates trapped within an air stream, the method comprising:

providing a particulate capture system having an air circulating chamber and a water injection chamber;

injecting an air stream having particulates trapped therein into the air circulating chamber;

circulating the air stream to separate a first portion of particulates from the air stream;

collecting the first portion of particulates separated from the air stream;

passing the air stream being devoid of the first portion of particulates through the water injection chamber; and injecting water into the water injection chamber to encapsulate and separate a second portion of particulates from the air stream while the air stream is passing through the water injection chamber.

2. The method of claim 1 further comprising collecting the water encapsulated second portion of particulates separated from the air stream within a liquid storage container.

3. The method of claim 2 further comprising transmitting the water encapsulated second portion of particulates collected within the liquid storage container to a cooling system and blending the water encapsulated second portion of particulates with a bulk product within the cooling system.

4. A particulate capture system comprising:

an air circulating chamber having at least one inlet port through which an air stream containing trapped particulates can be introduced into the air circulating chamber and further having at least one discharge port through which trapped particulates released from the air stream within the air circulating chamber can be discharged from the air circulating chamber;

a water injection chamber having at least one injection port configured to allow injection of water into the water injection chamber such that the air stream containing trapped particulates that is introduced into the water injection chamber can be mixed with injected water to create muddy water and further having at least one discharge port through which the air stream and the muddy water can be discharged from the water injection chamber; a rotatable paddle assembly axially disposed through the air circulating chamber and the water injection chamber, the rotatable paddle assembly having a plurality of circumferentially spaced paddles defining at least one rotation path; and a transition structure for passing the air stream from the air circulating chamber into the water injection chamber while simultaneously preventing trapped particulates released from the air stream within the air circulating chamber from entering into the water injection chamber.

5. The particulate capture system of claim 4 wherein the at least one air circulating chamber discharge port further comprises a meter for metering a volumetric flow discharge of particulates released from the air stream within the air circulating chamber.

6. The particulate capture system of claim 5 wherein the meter for metering a volumetric flow discharge of particulates comprises a slotted orifice gate having a selectively variable slot width.

7. The particulate capture system of claim 6 wherein the transition structure for passing the air stream from the air circulating chamber into the water injection chamber while simultaneously preventing particulates released from the air stream within the air circulating chamber from entering into the water injection chamber comprises a substantially solid baffle having an orifice disposed there through, the baffle constructed and arranged such that the rotatable paddle assembly can direct the air stream through the orifice and simultaneously direct particulates released from the air stream away from the orifice.

8. The particulate capture system of claim 7 wherein the rotatable paddle assembly comprises an air circulating portion and a mixed air and water circulating portion.

9. The particulate capture system of claim 8 wherein the air circulating portion is configured with a first number of paddles and the mixed air and water circulating portion is configured with a second number of paddles.

10. The particulate capture system of claim 9 wherein the second number of paddles is greater than the first number of paddles.

11. The particulate capture system of claim 10 wherein the second number of paddles associated with the water circulating portion is configured with paddles having a shorter length than paddles associated with the first number of paddles.

12. A particulate capture system comprising:

a substantially cylindrical housing having an air circulating chamber and a water injection chamber, the air circulation chamber removing at least some particulates from an air stream through circulation of the air, the water injection chamber having at least one water injection port for injecting water into the air stream; and a transition structure for passing the air stream from the air circulating chamber into the water injection chamber such that the particulates released from the air stream within the air circulating chamber are prevented from entering into the water injection chamber.

13. The particulate capture system of claim 12 wherein the transition structure for passing an air stream from the air circulating chamber into the water injection chamber further comprises a substantially solid baffle having an orifice disposed therethrough and configured such that a rotatable paddle assembly positioned within the air circulating chamber and the water injection chamber can direct the air stream through the orifice and simultaneously prevent particulates released from the air stream from passing through the orifice.

14. The particulate capture system of claim 12 further comprising at least one inlet port through which the air stream containing particulates can be introduced into the air circulating chamber.

15. The particulate capture system of claim 12 further comprising at least one discharge port through which the particulates released from the air stream within the air circulating chamber can be discharged from the air circulating chamber.

16. The particulate capture system of claim 15 wherein the at least one discharge port further comprises a meter for metering a volumetric flow discharge of particulates released from the air stream within the air circulating chamber.

17. The particulate capture system of claim 16 wherein the meter for metering a volumetric flow discharge of particulates comprises a slotted orifice gate having a selectively variable slot width.

18. A particulate capture system comprising:
an air circulation chamber for circulating an air stream to release a first portion of particulates trapped by the air stream;

at least one discharge port for capturing the first portion of particulates; and a water injection chamber for mixing an air stream with water injected therein to encapsulate a second portion of particulates trapped by the air stream in water, thereby providing a water encapsulated second portion of particulates.

19. The particulate capture system of claim 18 further comprising a storage tank for capturing the water encapsulated second portion of particulates.

20. The particulate capture system of claim 19 wherein the storage tank further comprises a cooling system configured to blend the water encapsulated second portion of particulates with a bulk product being processed by the cooling system.

* * * * *